(12) United States Patent
Wormald et al.

(10) Patent No.: US 10,979,400 B2
(45) Date of Patent: *Apr. 13, 2021

(54) METHOD AND SYSTEM FOR INSTANT MESSAGING CONVERSATION SECURITY

(75) Inventors: Chris Wormald, Kitchener (CA); Gerhard Dietrich Klassen, Waterloo (CA); Luis Pablo Estable, Hull (CA)

(73) Assignee: BlackBerry Limited, Waterloo (CA)

( * ) Notice: Subject to any disclaimer, the term of this patent is extended or adjusted under 35 U.S.C. 154(b) by 351 days.

This patent is subject to a terminal disclaimer.

(21) Appl. No.: 13/571,427

(22) Filed: Aug. 10, 2012

(65) Prior Publication Data

US 2012/0304080 A1    Nov. 29, 2012

Related U.S. Application Data

(63) Continuation of application No. 11/184,845, filed on Jul. 20, 2005, now Pat. No. 8,266,219.

(51) Int. Cl.
| | |
|---|---|
| *G06F 3/00* | (2006.01) |
| *H04L 29/06* | (2006.01) |
| *H04L 12/58* | (2006.01) |
| *G06F 3/048* | (2013.01) |

(52) U.S. Cl.
CPC ............ *H04L 63/04* (2013.01); *G06F 3/048* (2013.01); *H04L 51/04* (2013.01); *H04L 63/104* (2013.01); *H04L 51/38* (2013.01)

(58) Field of Classification Search
CPC ......... G06F 3/048; H04L 63/04; H04L 51/04; H04L 63/104; H04L 51/38
USPC ....................................................... 715/733
See application file for complete search history.

(56) References Cited

U.S. PATENT DOCUMENTS

| | | | | |
|---|---|---|---|---|
| 5,239,584 | A * | 8/1993 | Hershey ................. | G06Q 50/06 380/28 |
| 5,287,488 | A * | 2/1994 | Sakata ...................... | G06F 8/71 703/22 |
| 6,076,100 | A * | 6/2000 | Cottrille .................... | G06F 9/54 709/203 |
| 6,594,693 | B1 * | 7/2003 | Borwankar .......... | H04L 12/1827 709/203 |

(Continued)

FOREIGN PATENT DOCUMENTS

EP    1411709 A2    4/2004

OTHER PUBLICATIONS

Canadian Intellectual Property Office, Examiner's Requisition dated Dec. 3, 2009, issued in Canadian Patent Application No. 2,552,256.

(Continued)

*Primary Examiner* — Tadesse Hailu
*Assistant Examiner* — Andrew Chung
(74) *Attorney, Agent, or Firm* — Ridout and Maybee LLP

(57) ABSTRACT

A method for securing an instant messaging ("IM") conversation between at least a first and a second user, the first and second users having a first and a second client, respectively, in communication over a network, the method comprising: receiving a command from the first user through an input device and a graphical user interface ("GUI") presented on a display of the first client to disable copying of the IM conversation; and, transmitting a message to the second client to inform the second client and the second user that copying of the IM conversation has been disabled.

15 Claims, 9 Drawing Sheets

(56) References Cited

U.S. PATENT DOCUMENTS

| | | | |
|---|---|---|---|
| 6,714,793 B1 | 3/2004 | Carey et al. | |
| 6,721,784 B1 | 4/2004 | Leonard et al. | |
| 6,760,580 B2 | 7/2004 | Robinson et al. | |
| 6,920,564 B2 | 7/2005 | Decuir | |
| 7,032,007 B2 | 4/2006 | Fellenstein et al. | |
| 7,218,943 B2* | 5/2007 | Klassen | H04L 51/16 455/412.1 |
| 7,257,617 B2 | 8/2007 | Brown et al. | |
| 7,512,652 B1* | 3/2009 | Appelman | G06Q 10/107 709/204 |
| 7,519,670 B2* | 4/2009 | Hagale | G06Q 10/107 709/206 |
| 7,558,267 B2 | 7/2009 | Ionescu | |
| 7,558,828 B1* | 7/2009 | Panzer | H04L 51/04 709/205 |
| 7,640,293 B2* | 12/2009 | Wilson | H04L 12/1827 709/203 |
| 8,190,999 B2* | 5/2012 | Chen | G06Q 10/107 715/753 |
| 2002/0174010 A1 | 11/2002 | Rice, III | |
| 2003/0023683 A1 | 1/2003 | Brown et al. | |
| 2003/0065721 A1* | 4/2003 | Roskind | G06Q 10/107 709/204 |
| 2003/0163525 A1* | 8/2003 | Hendriks | G06Q 10/10 709/204 |
| 2003/0163537 A1* | 8/2003 | Rohall | G06Q 10/107 709/206 |
| 2003/0177191 A1* | 9/2003 | Kawashima | G06Q 10/107 709/206 |
| 2003/0204720 A1 | 10/2003 | Schoen et al. | |
| 2004/0078446 A1* | 4/2004 | Daniell | H04L 63/102 709/206 |
| 2004/0139163 A1 | 7/2004 | Adams et al. | |
| 2004/0143632 A1 | 7/2004 | McCarty | |
| 2004/0148356 A1* | 7/2004 | Bishop, Jr. | H04L 51/38 709/206 |
| 2004/0165924 A1 | 8/2004 | Griffin | |
| 2004/0186885 A1* | 9/2004 | Galli | G06Q 10/10 709/206 |
| 2004/0186886 A1* | 9/2004 | Galli | H04L 51/04 709/206 |
| 2004/0201623 A1* | 10/2004 | Hamilton | H04L 12/581 715/751 |
| 2004/0247131 A1* | 12/2004 | Buer | G06Q 20/3674 380/278 |
| 2005/0120212 A1* | 6/2005 | Kanungo | H04L 63/0428 713/170 |
| 2005/0132013 A1 | 6/2005 | Karstens | |
| 2005/0159136 A1* | 7/2005 | Rouse | H04M 3/493 455/412.1 |
| 2005/0267942 A1* | 12/2005 | Quinn | H04L 51/04 709/206 |
| 2005/0278413 A1* | 12/2005 | Tannenbaum | G06Q 10/107 709/202 |
| 2006/0047748 A1 | 3/2006 | Keslo et al. | |
| 2006/0149822 A1* | 7/2006 | Henry | H04L 51/24 709/206 |
| 2006/0248149 A1* | 11/2006 | Kraft | H04L 12/1818 709/206 |
| 2007/0005713 A1* | 1/2007 | LeVasseur | H04L 51/14 709/206 |
| 2008/0163384 A1 | 7/2008 | Crance | |

OTHER PUBLICATIONS

Ogilvy Renault, Response to Examiner's Requisition dated May 28, 2010, filed in Canadian Patent Application No. 2,552,256.
Canadian Intellectual Property Office, Notice of Allowance dated Nov. 1, 2010, issued in Canadian Patent Application No. 2,552,256.
European Patent Office, Extended European Search Report dated Oct. 18, 2005, issued in European Patent Application No. 05106674. 4.
Ipulse, Response to Extended European Search Report dated Jan. 18, 2006, filed in European Patent Application No. 05106674.4.
European Patent Office, Notice of Intent to Grant dated Mar. 2, 2007, issued in European Patent Application No. 05106674.4.
European Patent Office, Decision to Grant dated Jun. 28, 2007, issued in European Patent Application No. 05106674.4.
Ogilvy Renault, Preliminary Amendment dated Jul. 24, 2008, filed in U.S. Appl. No. 11/184,845.
United States Patent and Trademark Office, Office Action dated Jun. 4, 2009, issued in U.S. Appl. No. 11/184,845.
Ogilvy Renault, Response to Office Action dated Jul. 2, 2009, filed in U.S. Appl. No. 11/184,845.
United States Patent and Trademark Office, Office Action dated Jul. 27, 2009, issued in U.S. Appl. No. 11/184,845.
Ogilvy Renault, Response to Office Action dated Sep. 22, 2009, filed in U.S. Appl. No. 11/184,845.
United States Patent and Trademark Office, Office Action dated Sep. 30, 2009, issued in U.S. Appl. No. 11/184,845.
United States Patent and Trademark Office, Office Action dated Dec. 29, 2009, issued in U.S. Appl. No. 11/184,845.
Ogilvy Renault, Response to Office Action dated May 28, 2010, filed in U.S. Appl. No. 11/184,845.
United States Patent and Trademark Office, Office Action dated Jun. 30, 2010, issued in U.S. Appl. No. 11/184,845.
United States Patent and Trademark Office, Office Action dated Jul. 7, 2010, issued in U.S. Appl. No. 11/184,845.
Ogilvy Renault, Statement of Substance of Interview dated Aug. 6, 2010, filed in U.S. Appl. No. 11/184,845.
United States Patent and Trademark Office, Office Action dated Sep. 1, 2010, issued in U.S. Appl. No. 11/184,845.
Ogilvy Renault, Response to Office Action dated Dec. 1, 2010, filed in U.S. Appl. No. 11/184,845.
Ogilvy Renault, Petition under 37 CFR 1.183, dated Dec. 1, 2010, filed in U.S. Appl. No. 11/184,845.
United States Patent and Trademark Office, Office Action dated Apr. 13, 2011, issued in U.S. Appl. No. 11/184,845.
Norton Rose, Response to Office Action dated Oct. 13, 2011, filed in U.S. Appl. No. 11/184,845.
United States Patent and Trademark Office, Office Action dated Dec. 6, 2011, issued in U.S. Appl. No. 11/184,845.
Norton Rose, Response to Office Action dated Mar. 1, 2012, filed in U.S. Appl. No. 11/184,845.
United States Patent and Trademark Office, Notice of Allowance dated May 10, 2012, issued in U.S. Appl. No. 11/184,845.
Declaration of Krishna K. Pathiyal originally submitted in respect of U.S. Appl. No. 11/184,845, including Exhibits; 21 pages Oct. 13, 2011.
Declaration of Chris Wormald and Gerhard Klassen originally submitted in respect of U.S. Appl. No. 11/184,845, including Exhibits; 90 pages May 2010.
Declaration of Chris Wormald originally submitted in respect of U.S. Appl. No. 11/184,845, including Exhibits; 14 pages Sep. 2, 2009.
Declaration of Gerhard Klassen, originally submitted in respect of U.S. Appl. No. 11/184,845; 5 pages May 14, 2010.
Petition requesting waiver of the signature of an unavailable inventor under 37 CFR 1.183, including exhibits; U.S. Appl. No. 11/184,845, filed Dec. 1, 2010.
Decision Granting Petition requesting waiver of the signature of an unavailable inventor under 37 CFR 1.183 RE U.S. Appl. No. 11/184,845, filed Apr. 7, 2011.

* cited by examiner

500

510

METHOD AND SYSTEM FOR INSTANT MESSAGING CONVERSATION SECURITY

CROSS REFERENCE TO RELATED APPLICATIONS

This application is a continuation of U.S. application Ser. No. 11/184,845, filed Jul. 20, 2005, now U.S. Pat. No. 8,266,219, the entirety of which is hereby incorporated by reference.

FIELD OF THE APPLICATION

This application relates to the field of instant messaging ("IM"), and more specifically, to providing security for IM content exchanged between users of wireless and other devices.

BACKGROUND

Current wireless mobile communication devices include microprocessors, memory, soundcards, and run one or more software applications. Examples of software applications used in these wireless devices include micro-browsers, address books, electronic mail ("email") clients, IM clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

IM has been referred to as a combination of email and chat room functionality. In general, IM is a client-server push messaging service that runs over the Internet and that alerts users when friends or colleagues are online and allows them to communicate with each other in real-time. IM differs from email in the immediacy of the message exchange and also makes a continued exchange simpler than sending email back and forth. In addition, unlike email messages, IMs (or IM messages) do not experience the store-and-forward delays typical of traditional email messages. Moreover, unlike Internet browsing software, which is used to access various web pages, IM is primarily used by a subscriber to converse with one or more other IM users. A common feature of IM is the use of presence information between correspondents.

In general, to access an IM service, a user registers with a service provider and, after connecting to the Internet (or other appropriate data network), enters their screen name and password to log in to the IM network. Once a user has logged in to the appropriate IM network, his presence on the system is made known to all other authorized users. The user can then engage in typed conversations with other IM users connected to the system.

With IM, a user typically creates a list (e.g., a "buddy list") of other users (e.g., "buddies") with whom he or she wishes to communicate, then, when a user from his or her list is online, the service alerts the user and enables immediate contact with the other user. Using a graphical user interface ("GUI") and input device (e.g., a mouse), the user clicks on a name presented in the buddy list presented on a display screen and types a message. The message then pops up in a window on the buddy's display screen. Other users in the buddy list can join in on the conversation much like a telephone conference call.

In more detail, three architectural schema are available for facilitating the transmission of IMs between users are currently available. The first scheme uses a centralized network, in which users are connected to one another through a series of network servers. The individual servers are linked together to form a large, centralized network. In this architecture, each server keeps track of the presence information and connections for each user connected to the network. When a user sends an IM, the server determines the location of the recipient's computer by contacting all of the other network servers and routes the message through the network servers until it reaches the recipient. This particular method is used by Microsoft Network (MSN®) Messenger IM service.

A second scheme of transmitting IMs uses a peer-to-peer architecture favoured by systems using ICQ protocol (pronounced "I seek you"), such as the Yahoo!® Messenger IM service. In the peer-to-peer approach, the central ICQ server keeps track of which users are currently online and records their Internet Protocol ("IP")-based IM addresses. Once a user logs on to the ICQ server, the ICQ server scans the user's contact list and displays to the user the Internet IM protocol address of every person on the contact list currently logged onto the IM server. When the user wants to send an IM to a recipient on the ICQ server, the user simply selects the name of the recipient, types a message, and transmits the message. Because the ICQ client on the user's computer has the Internet Protocol IM address of the recipient, the message is sent directly to the ICQ client residing on the recipient's computer without involving the ICQ server. This method has an advantage over the centralized network system because the messages do no travel through the entire network, which speeds the transfers of large files, such as documents and images because they are not slowed by network traffic.

When the conversation is complete, the user exits the IM program, at which point the ICQ client on the user's computer generates a message to the ICQ server to terminate the session. The ICQ client then sends a message to each ICQ client on the user's contact list, that are currently logged onto the ICQ server, indicating that the user has terminated his session.

The third method of transmitting IMs is using a hybrid system that combines the centralized network approach with the peer-to-peer approach. America On Line's (AOL®'s) Instant Messaging (AIM®) service currently uses this method. The AOL® AIM Service uses the centralized network approach for transmitting text messages and performing presence management. Because text messages are usually small, transmitting them over the network does not noticeably slow their delivery. However, for large files, such as document and images, AOL® AIM service uses ICQ protocol to establish a peer-to-peer connection between the user and the recipient of the message.

One problem that has arisen with IM services relates to IM message content security. IM conversations between two parties can vary widely in scope. While it may be desirable to preserve a typical IM conversation indefinitely or to transfer it to another communication means such as email, there will be some IM conversations that contain sensitive information or commentary that could be damaging to one party if the other party were to publish the conversation or make it available to a third party.

A need therefore exists for a method and system for securing IM content in wireless and other devices. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1:
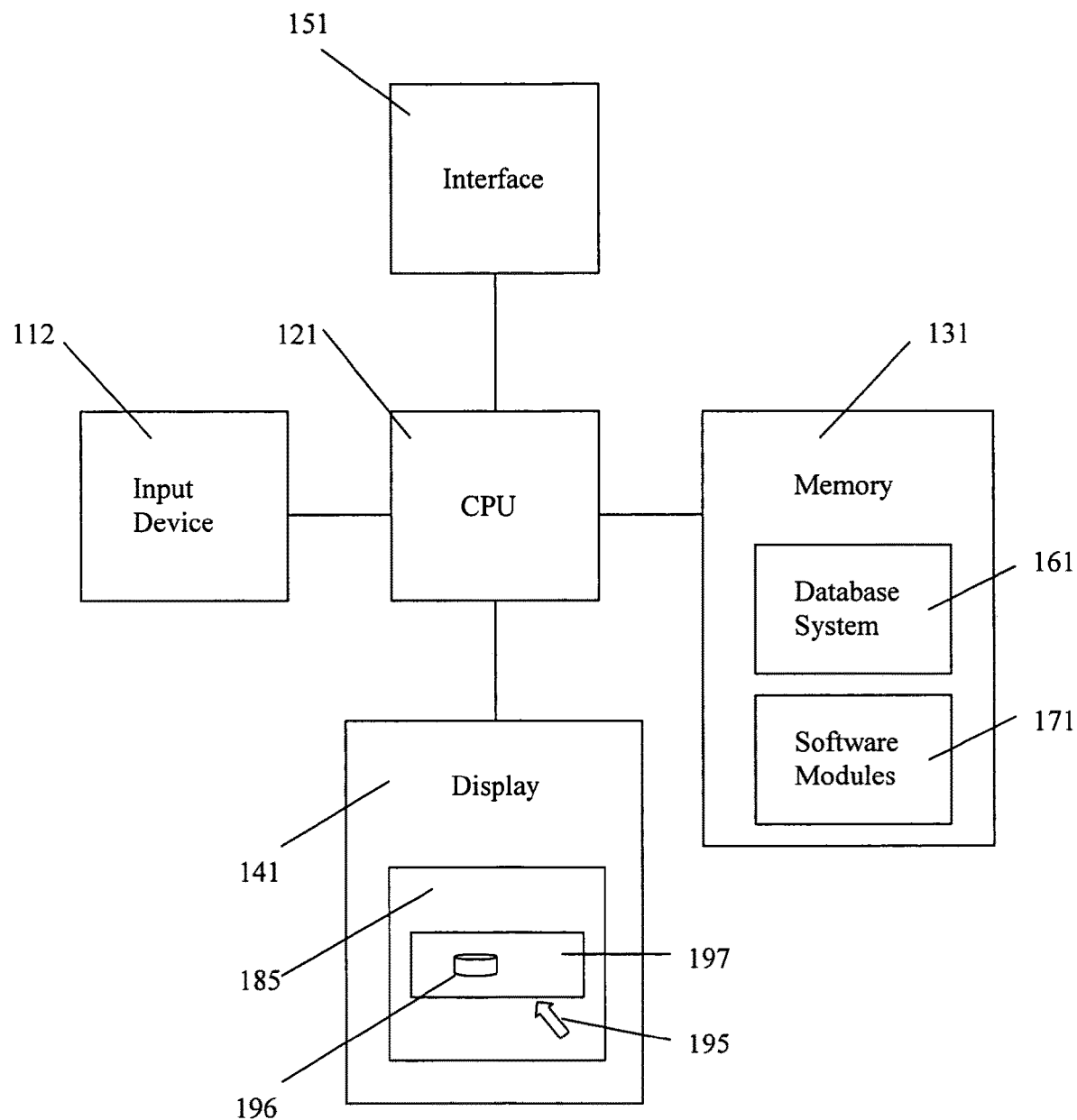
FIG. 1 is a block diagram illustrating a data processing system adapted for implementing an embodiment of the application.

The following detailed description of the embodiments of the present application does not limit their implementation to any particular computer programming language. The embodiments of the present application may be implemented in any computer programming language provided that the operating system ("OS") provides the facilities that may support the requirements of these embodiments. A preferred embodiment is implemented in the JAVA™ computer programming language (or other computer programming languages such as C or C++). (JAVA and all JAVA-based trademarks are the trademarks of Sun Microsystems Corporation.) Any limitations presented would be a result of a particular type of operating system or computer programming language and would not be a limitation of the embodiments of the present application.

According to one embodiment, there is provided a method for securing an instant messaging ("IM") conversation between at least a first and a second user, the first and second users having a first and a second client, respectively, in communication over a network, the method comprising: receiving a command from the first user through an input device and a graphical user interface ("GUI") presented on a display of the first client to disable copying of the IM conversation; and, transmitting a message to the second client to inform the second client and the second user that copying of the IM conversation has been disabled.

Preferably, the copying includes at least one of cutting, pasting, editing, viewing, reading, forwarding, and programmatically accessing. Preferably, the method further includes receiving a command from the first user to delete at least a portion of the IM conversation after a period of time. Preferably, the method further includes: disabling copying of the IM conversation; receiving a command from the first user to transmit a message to the second client to request the second user for permission to enable copying of the IM conversation; receiving a message at the first client from the second client granting permission to enable copying of the IM conversation; and, enabling copying of the IM conversation. Preferably, the second client and the second user are an IM server and an IM server user, respectively. Preferably, a first portion of the IM conversation is attributable to the first user and the method further includes receiving a command from the first user to disable copying of the first portion of the IM conversation while the first client is offline. Preferably, at least one of the first and second clients is a wireless device having a keyboard for selecting items in the GUI to generate commands, wherein the keyboard is one of a QWERTY keyboard, a modified QWERTY keyboard, a Dvorak keyboard, and an predictive text keyboard.

In accordance with further aspects of the present application there are provided apparatus such as a data processing system and a wireless device, methods for adapting these, as well as articles of manufacture such as a computer readable medium having program instructions recorded thereon for practising the method of the application.

FIG. 1 is a block diagram illustrating a data processing system 101 adapted for implementing an embodiment of the application. The data processing system 101 includes an input device 112, a central processing unit or CPU 121, memory 131, a display 141, and an interface 151. The input device 112 may include a keyboard, mouse, trackball, remote control, or similar device. The CPU 121 may include dedicated coprocessors and memory devices. The memory 131 may include RAM, ROM, or disk devices. The display 141 may include a computer screen, terminal device, or a hardcopy producing output device such as a printer or plotter. And, the interface 151 may include a network connection including an Internet connection and a wireless network 100 connection (see FIG. 2). The data processing system 101 is adapted for communicating with other data processing systems (not shown) over a network and/or with wireless devices 102 (see FIG. 2) over a wireless network 100.

The data processing system 101 may be a server system or a personal computer ("PC") system. The CPU 121 of the system 101 is operatively coupled to memory 131 which stores an operating system (not shown), such as IBM Corporation's OS/2™, UNIX, etc., for general management of the system 101. As mentioned, the interface 151 may be used for communicating to external data processing systems (not shown) through a network (such as the Internet) or wireless network 100 (see FIG. 2). Examples of suitable platforms for the system 101 include iSeries™ servers and ThinkCentre™ personal computers available from IBM Corporation. The system 101 may include application server software (not shown), such as WebLogic® Server available from BEA Systems, Inc., for developing and managing distributed applications.

The data processing system 101 may include a database system 161 for storing and accessing programming information. The database system 161 may include a database management system ("DBMS") and a database and is stored in the memory 131 of the data processing system 101.

The data processing system 101 includes computer executable programmed instructions for directing the system 101 to implement the embodiments of the present application. The programmed instructions may be embodied in one or more software modules 171 resident in the memory 131 of the data processing system 101. Alternatively, the programmed instructions may be embodied on a computer readable medium (such as a CD disk or floppy disk) which may be used for transporting the programmed instructions to the memory 131 of the data processing system 101. Alternatively, the programmed instructions may be embedded in a computer-readable, signal-bearing medium that is uploaded to a network by a vendor or supplier of the programmed instructions, and this signal-bearing medium may be downloaded through the interface 151 to the data processing system 101 from the network by end users or potential buyers.

The CPU 121 of the system 101 is typically coupled to one or more devices 112 for receiving user commands or queries and for displaying the results of these commands or queries to the user on a display 141. As mentioned, the memory 131 may include a variety of storage devices including internal memory and external mass storage typically arranged in a hierarchy of storage as understood to those skilled in the art.

A user may interact with the data processing system 101 and its software modules 171 using a graphical user interface ("GUI") 185. The GUI 185 may be web-based or may be a stand-alone application and may be used for monitoring, managing, and accessing the data processing system 101. GUIs are supported by common operating systems and provide a display format which enables a user to choose commands, execute application programs, manage computer files, and perform other functions by selecting pictorial representations known as icons, or items from a menu through use of an input or pointing device such as a mouse 112. In general, a GUI is used to convey information to and receive commands from users and generally includes a variety of GUI objects or controls, including icons, toolbars, drop-down menus, text, dialog boxes, buttons, and the like. A user typically interacts with a GUI 185 presented on a display 141 by using an input or pointing device (e.g., a mouse) 112 to position a pointer or cursor 195 over an object 196 and by "clicking" on the object 196.

Typically, a GUI based system presents application, system status, and other information to the user in "windows" appearing on the display 141. A window 197 is a more or less rectangular area within the display 141 in which a user may view an application or a document. Such a window 197 may be open, closed, displayed full screen, reduced to an icon, increased or reduced in size, or moved to different areas of the display 141. Multiple windows may be displayed simultaneously, such as: windows included within other windows, windows overlapping other windows, or windows tiled within the display area.

Figure 2:
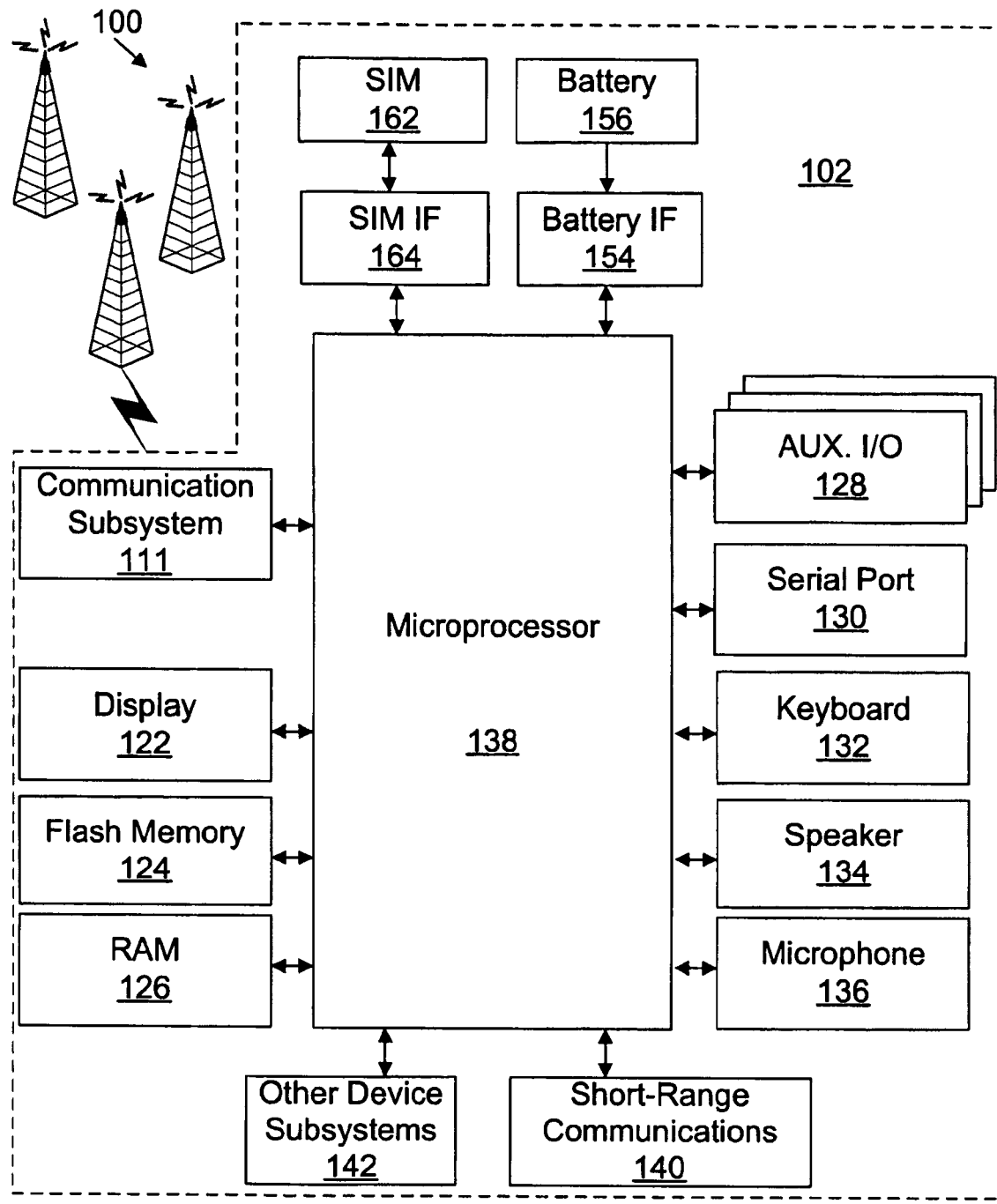
FIG. 2 is a block diagram illustrating a wireless device and a wireless communications system adapted for implementing an embodiment of the application.

FIG. 2 is a block diagram illustrating a wireless device 102 and a wireless network 100 adapted for implementing an embodiment of the application. Typically, the wireless device 102 is a handheld device 102. The wireless network 100 includes antenna, base stations, and supporting radio equipment, known to those of ordinary skill in the art, for supporting wireless communications between the wireless device 102, other wireless devices (not shown), and other systems such as the data processing system 101. The wireless network 100 may be coupled to a wireless network gateway (not shown) and to a wide area network (not shown) to which the data processing system 101 may be coupled through its interface 151.

The wireless device 102 is a two-way communication device having advanced data communication capabilities, including the capability to communicate with other computer systems 101, and optionally having voice communication capabilities. Depending on the functionality provided by the device 102, it may be referred to as a data messaging device, a two-way pager, a cellular telephone with data messaging capabilities, a wireless Internet appliance, or a data communication device (with or without telephony capabilities). The device 102 may communicate with any one of a plurality of fixed transceiver stations within its geographic coverage area.

The wireless device 102 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in field of communications, particular design of the communication subsystem 111 depends on the communication network 100 in which the device 102 is intended to operate.

Network access is associated with a subscriber or user of the device 102 and therefore the device 102 may require a Subscriber Identity Module (or "SIM" card) 162 to be inserted in a SIM interface ("IF") 164 in order to operate in the network. The device 102 is a battery-powered device so it also includes a battery IF 154 for receiving one or more rechargeable batteries 156. Such a battery 156 provides electrical power to most if not all electrical circuitry in the device 102, and the battery IF 154 provides for a mechanical and electrical connection for it. The battery IF 154 is coupled to a regulator (not shown) which provides power to the circuitry of the device 102.

The wireless device 102 includes a microprocessor (or central processing system ("CPU")) 138 which controls overall operation of the device 102. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port 130, a keyboard 132, a speaker 134, a microphone 136, a short-range communications subsystem 140, and any other device subsystems generally designated at 142. Some of the subsystems shown in FIG. 2 perform communication-related functions, whereas other subsystems may provide "resident" or on-device functions. Notably, some subsystems, such as the keyboard 132 and display 122, for example, may be used for both communication-related functions, such as entering a text message for transmission over a communication network 100, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 102. A predetermined set of applications which control basic device operations, including at least data and voice communication applications, will normally be installed on the device 102 during its manufacture. A preferred application that may be loaded onto the device 102 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 102 and SIM 162 to facilitate storage of PIM data items and other information.

The PIM application preferably has the ability to send and receive data items via the wireless network 100. In a preferred embodiment, PIM data items are seamlessly integrated, synchronized, and updated via the wireless network 100, with the wireless device user's corresponding data items stored and/or associated with a host computer system such as the data processing system 101 thereby creating a mirrored host computer on the device 102 with respect to such items. This is especially advantageous where the host computer system is the wireless device user's office computer system. Additional applications may also be loaded onto the device 102 through the network 100, an auxiliary I/O subsystem 128, serial port 130, short-range communications subsystem 140, or any other suitable subsystem 142, and installed by a user in RAM 126 or preferably in a non-volatile store (not shown) for execution by the microprocessor 138. Such flexibility in application installation increases the functionality of the device 102 and may provide enhanced on-device functions, communication-related functions, or both. For example, secure communication applications may enable electronic commerce functions and other such financial transactions to be performed using the wireless device 102.

In a data communication mode, a received signal such as a text message, an email message, an IM message, or web page download will be processed by the communication subsystem 111 and input to the microprocessor 138. The microprocessor 138 will preferably further process the signal for output to the display 122 and/or to the auxiliary I/O device 128. A user of the wireless device 102 may also compose data items, such as email and IM messages, for example, using the keyboard 132 in conjunction with the display 122 and possibly the auxiliary I/O device 128. These composed items may be transmitted over a communication network 100 through the communication subsystem 111 or the short range communication subsystem 140.

The keyboard 132 is preferably a complete alphanumeric keyboard and/or telephone-type keypad. For example, according to one embodiment, the keyboard 132 is a QWERTY keyboard including a full set of keys or buttons corresponding to those on a standard English computer keyboard or typewriter. Alternatively, the keyboard 132 may be a modified QWERTY keyboard including a modified arrangement or subset of the QWERTY keyboard. Alternatively, the keyboard 132 may be a Dvorak keyboard or modified Dvorak keyboard. Unlike a QWERTY keyboard, the Dvorak keyboard is designed so that the middle row of keys includes the most common letters. In addition, common letter combinations are positioned in such a way that they can be typed quickly.

According to another embodiment, the keyboard 132 may be a combination of a telephone style keypad and QWERTY style keyboard. For example, the keyboard 132 may have a 5×5 array of keys or buttons on which, unlike a traditional telephone layout that has letters overlaid on numbers in alphabetical order for text entry, the overlay for the keyboard may be in QWERTY order. Advantageously, the keyboard 132 allows users to quickly and accurately dial or type either using single-handed operation or two-handed thumb-typing without the limitations associated with traditional telephone keypads. For example, the user need not learn a new way to type.

In addition, the keyboard 132 may be a predictive text or disambiguating keyboard having associated with it a predictive text or disambiguating software module 206 (see FIG. 3) that allows QWERTY style typing, using a built-in dictionary and set of rules, to select the correct letter based on context. To help facilitate easy spelling and composition, the predictive text or disambiguating software module 206 includes intuitive software with a word list (e.g., over 30,000 words) and the ability to increase that list based on the frequency of use and the names in the handheld's address book. It may also have the ability to recognize character letter sequences that are common in the English language, such as "-ing". Advantageously, as the software 206 "understands" what a user is typing, the user can concentrate on composing his or her message rather than on the input method.

For voice communications, the overall operation of the wireless device 102 is substantially similar, except that the received signals would be output to the speaker 134 and signals for transmission would be generated by the microphone 136. Alternative voice or audio I/O subsystems, such as a voice message recording subsystem, may also be implemented on the device 102. Although voice or audio signal output is preferably accomplished primarily through the speaker 134, the display 122 may also be used to provide, for example, an indication of the identity of a calling party, duration of a voice call, or other voice call related information.

The serial port 130 shown in FIG. 2 is normally implemented in a personal digital assistant ("PDA")-type communication device for which synchronization with a user's desktop computer is a desirable, albeit optional, component. The serial port 130 enables a user to set preferences through an external device or software application and extends the capabilities of the device 102 by providing for information or software downloads to the device 102 other than through a wireless communication network 100. The alternate download path may, for example, be used to load an encryption key onto the device 102 through a direct and thus reliable and trusted connection to thereby provide secure device communications.

The short-range communications subsystem 140 shown in FIG. 2 is an additional optional component which provides for communication between the device 102 and different systems or devices, which need not necessarily be similar devices. For example, the subsystem 140 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
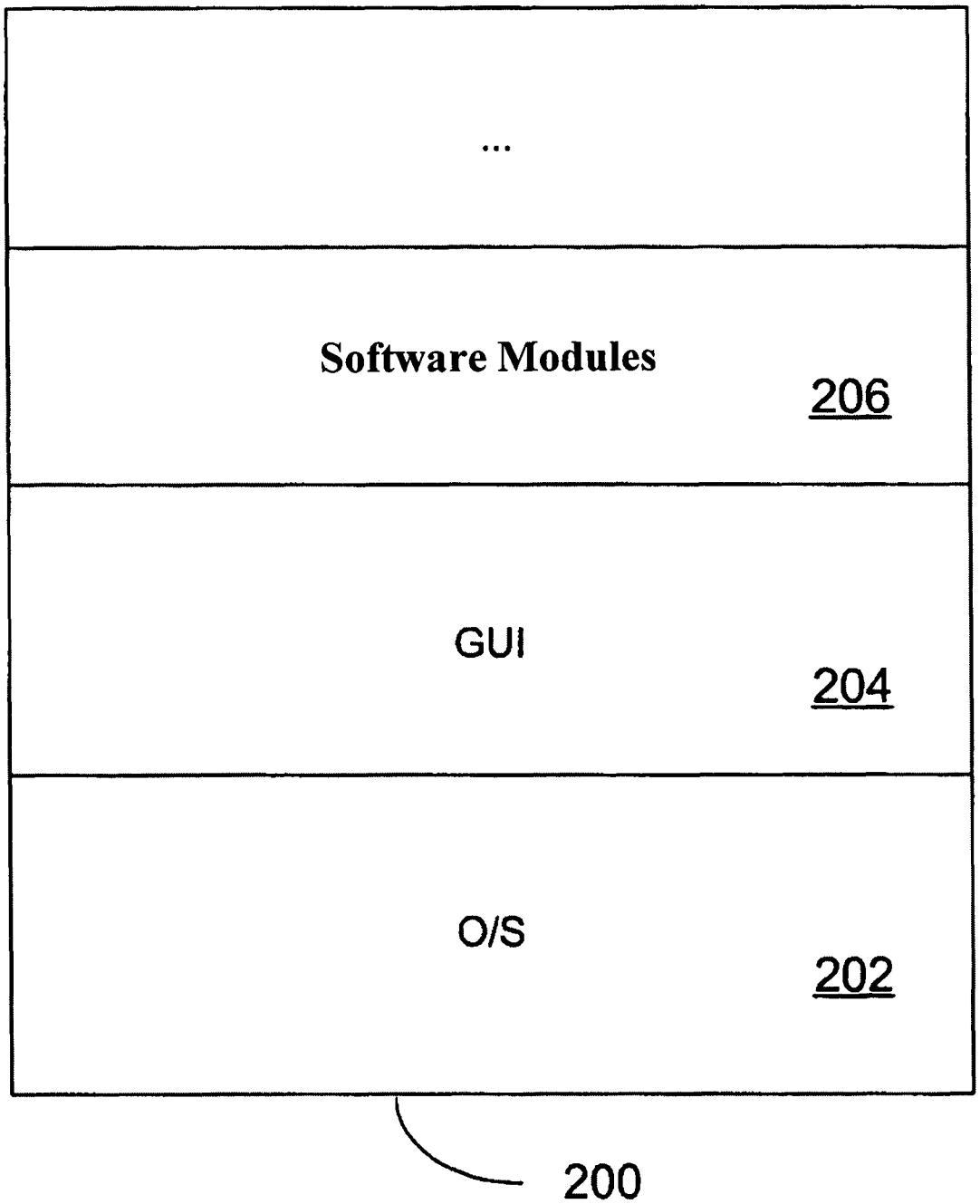
FIG. 3 is a block diagram illustrating a memory of the wireless device of FIG. 2.

FIG. 3 is a block diagram illustrating a memory 200 of the wireless device 102 of FIG. 2. The memory 200 has various software components for controlling the device 102 and may include flash memory 124, RAM 126, or ROM (not shown), for example. In accordance with one embodiment, the wireless device 102 is intended to be a multi-tasking wireless communications device configured for sending and receiving data items and for making and receiving voice calls. To provide a user-friendly environment to control the operation of the device 102, an operating system ("O/S") 202 resident on the device 102 provides a basic set of operations for supporting various applications typically operable through a graphical user interface ("GUI") 204. For example, the O/S 202 provides basic input/output system features to obtain input from the auxiliary I/O 128, keyboard 132, and the like, and for facilitating output to the user. In accordance with one embodiment, there are provided software modules 206 for IM conversation security as will be described below. Though not shown, one or more applications for managing communications or for providing personal digital assistant like functions may also be included.

Thus, the wireless device 102 includes computer executable programmed instructions for directing the device 102 to implement the embodiments of the present application. The programmed instructions may be embodied in one or more software modules 206 resident in the memory 200 of the wireless device 102. Alternatively, the programmed instructions may be embodied on a computer readable medium (such as a CD disk or floppy disk) which may be used for transporting the programmed instructions to the memory of the wireless device 102. Alternatively, the programmed instructions may be embedded in a computer-readable, signal-bearing medium that is uploaded to a network by a vendor or supplier of the programmed instructions, and this signal-bearing medium may be downloaded through an interface 111, 130, 140 to the wireless device 102 from the network by end users or potential buyers.

Figure 4:
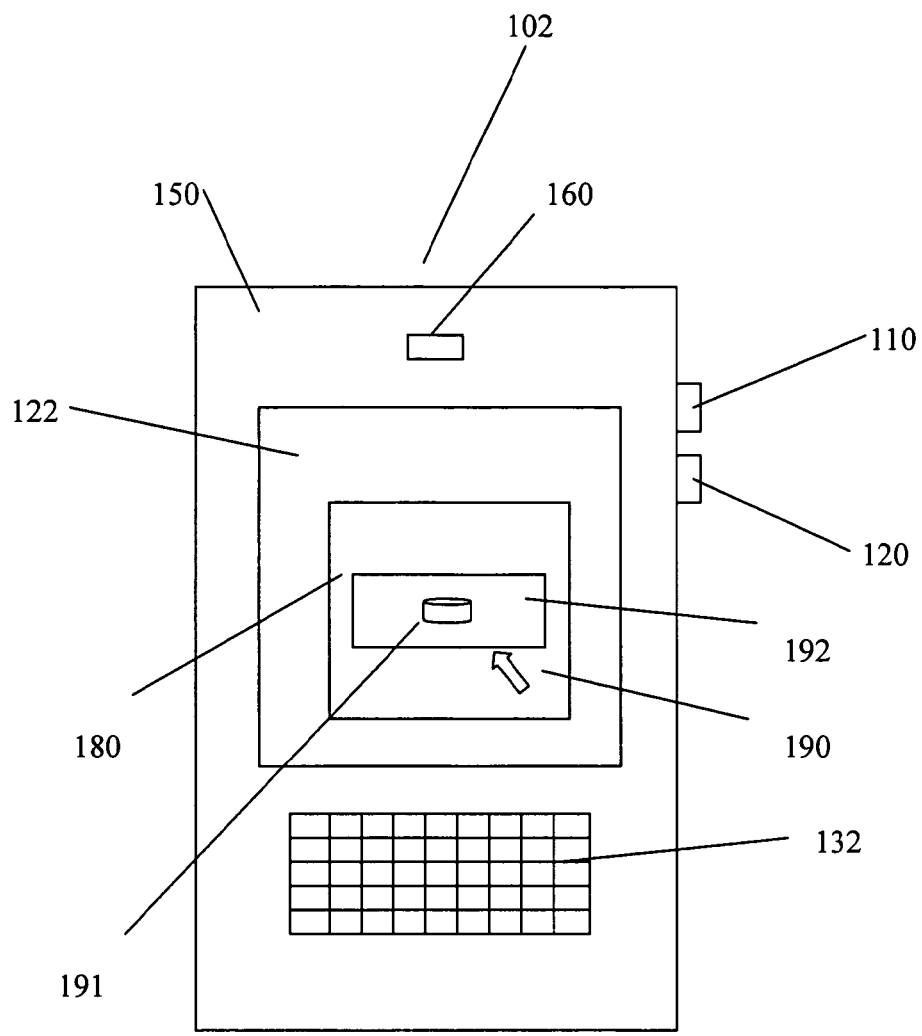
FIG. 4 is a front view illustrating the wireless device of FIG. 2.

FIG. 4 is a front view illustrating the wireless device 102 of FIG. 2. As mentioned above, the wireless device 102 can be a data and voice-enabled handheld device. The wireless device 102 includes a casing 150, a display screen 122 for displaying a graphical user interface ("GUI") 180, a keyboard (or keypad) 132, a clickable thumbwheel (or trackwheel) 110, various select buttons 120, and various signal inputs/outputs 160 (e.g., power connector input, microphone, speaker, data interface input, etc.). Internally, the wireless device 102 includes one or more circuit boards, a CPU 138, memory 200, a battery 156, an antenna, etc. (not shown) which are coupled to the signal inputs/outputs 160, keyboard 132, display screen 122, etc.

The microprocessor 138 of the wireless device 102 is typically coupled to one or more devices 110, 120, 132 for receiving user commands or queries and for displaying the results of these commands or queries to the user on the display 122. For example, user queries may be transformed into a combination of commands for producing one or more data displays for presentation to the user. The microprocessor 138 is coupled to memory 200 for containing software modules 206 and data such as database tables, web addressed, etc. As mentioned, the memory 200 may include a variety of storage devices typically arranged in a hierarchy of storage as understood to those skilled in the art.

A user may interact with the wireless device 102 and its software modules 206 using the graphical user interface ("GUI") 180. As mentioned, GUIs are supported by common operating systems and provide a display format which enables a user to choose commands, execute application programs, manage computer files, and perform other functions by selecting pictorial representations known as icons, or items from a menu through use of an input or pointing device such as a thumbwheel 110 and keyboard 132. In general, a GUI is used to convey information to and receive commands from users and generally includes a variety of GUI objects or controls, including icons, toolbars, drop-down menus, pop-up menus, text, dialog boxes, buttons, and the like. A user typically interacts with a GUI 180 presented on a display 122 by using an input or pointing device (e.g., a thumbwheel 110, a keyboard 132, etc.) to position a pointer or cursor 190 over an object 191 (i.e., "pointing" at the object) and by "clicking" on the object 191. (e.g., by depressing the thumbwheel 110, by depressing a button on the keyboard 132, etc.). This is often referred to as a point-and-click operation or a selection operation. Typically, the object 191 may be hi-lighted (e.g., shaded) when it is pointed at.

Typically, a GUI based system presents application, system status, and other information to the user in "windows" appearing on the display 122. A window 192 is a more or less rectangular area within the display 122 in which a user may view an application or a document. Such a window 192 may be open, closed, displayed full screen, reduced to an icon, increased or reduced in size, or moved to different areas of the display 122. Multiple windows may be displayed simultaneously, such as: windows included within other windows, windows overlapping other windows, or windows tiled within the display area.

According to one embodiment, one or more data processing systems 101 functioning as central IM servers are operably connected via an IP-based network (e.g., 100) to one or more wireless devices 102 running individual IM clients. To send an IM, for example, from a first IM client 102 to a second IM client (not shown), the first IM client 102 connects with the IM server 101 using an IM protocol, either proprietary or industry-standard. Once the first IM client 102 is connected to the IM server 101, the user logs on by entering a user name and password. The first IM client 102 then sends the IM server 101 the connection information, such as the IP address and number of the port assigned to the IM client and the name and address of everyone in the IM contact or buddy list associated with the IM client 102.

The IM server 101 then creates a temporary file that contains the connection information for the first IM client 102 and the second IM client. Once the temporary files have been created, the IM server 101 checks the network to determine whether any IM client identified by the contact list associated with the first IM client 102 is currently logged into the system. If the IM server 101 finds any of the contacts logged onto the network, the IM server 101 sends a message back to the first IM client 102 with the connection information for each IM client currently logged onto the network. When the IM client 102 receives the connection information, the status of that particular IM client is updated to online, an indication of which is displayed to the user (see below). At this point the user may select any IM client that is registered as being online, whereupon a dialog box will appear in which the user may enter text. Because the first IM client 102 knows the address and port number of the second IM client, the message is sent directly to the recipient second IM client. The second IM client then receives the instant message and can respond immediately. Once the IM session is complete the dialog box is closed and the first IM client 102 goes offline and sends a message to the IM server 101 terminating the session. The IM server 101, in response to acknowledging that the first IM client 102 has logged off, generates a message to each of the IM clients on the client list of IM client 102 indicating that the first IM client 102 is logged off the network.

As will be described below, enhanced IM functionality for securing the content of an IM conversation (i.e., the exchange of IMs or conversation going back and forth between two IM users engaged in an IM communication session) may be provided in accordance with an embodiment of the present application by way of software modules 171, 206 operable with the IM-capable data processing system 101 and wireless device 102. In one embodiment, such a software module 171, 206 may be provided as a plug-in that is operable with any of the known IM client applications such as, for example, an i3Connect Vista client, an ICQ client, an AOL® Instant Messenger (AIM®) client, a Microsoft Network (MSN) Messenger client, a Yahoo!® Messenger client, a JABBER client, a Miranda® IM client, an Internet Relay Chat (IRC) client, and the like. In another implementation, such a software module 171, 206 may be integrated within a proprietary IM application that can interoperate with commercially available IM applications.

Now, as mentioned above, one problem that has arisen with IM services relates to IM message content security. IM conversations between two parties can vary widely in scope. While it may be desirable to preserve a typical IM conversation indefinitely or to transfer it to another communication means such as email, there will be some IM conversations that contain sensitive information or commentary that could be damaging to one party if the other party were to publish the conversation or make it available to a third party.

Referring to FIGS. 1 and 4, a first user of an IM service may access the service through the GUI 185 of a data processing system 101 (i.e., acting as a first IM client) while a second user may access the service through the GUI 180 of a wireless device 102 (i.e., acting as a second IM client). Using the input device 112 (e.g., keyboard and mouse, etc.) of the data processing system 101, the first user may log into the IM service by entering a valid user name and password into an IM message window 197 presented on the system's display 141. Similarly, the second user may also log into the IM service using the keyboard 132 and clickable thumbwheel 110 of the wireless device 102 by entering a valid user name and password into an IM message window 192 presented on the device's display 122.

With both users on-line, the first user may compose a first IM message using the input device 112 and GUI 185 of the first IM client 101 and send it to the second user. The first message will then appear in the IM message window 192 of the GUI 180 of the wireless device 102. Similarly, the second user may compose a second IM message using the keyboard 132, clickable thumbwheel 110, and GUI 185 of the second IM client 102 and send it to the first user in response to the first message. The second message will typically contain the content of the first message (often referred to as a message thread). The content of the first and second messages represents an IM conversation between the first and second users.

Figure 5:
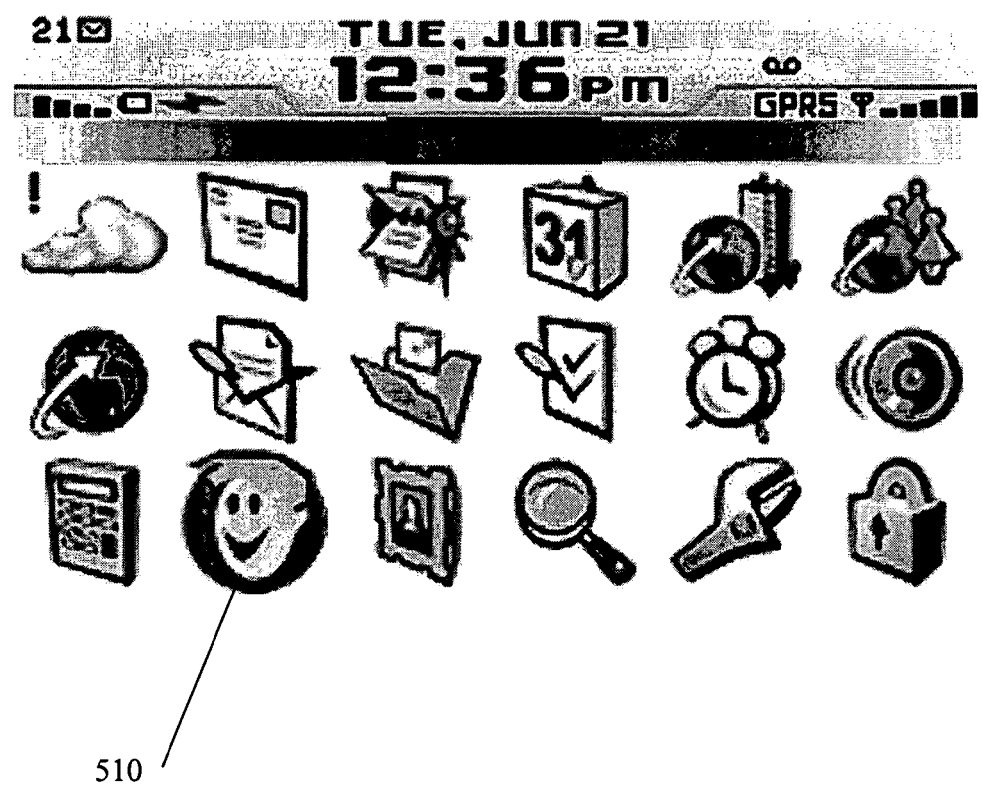
FIG. 5 is a screen capture illustrating an application menu GUI for a wireless device or data processing system in accordance with an embodiment of the application.
Figure 6:
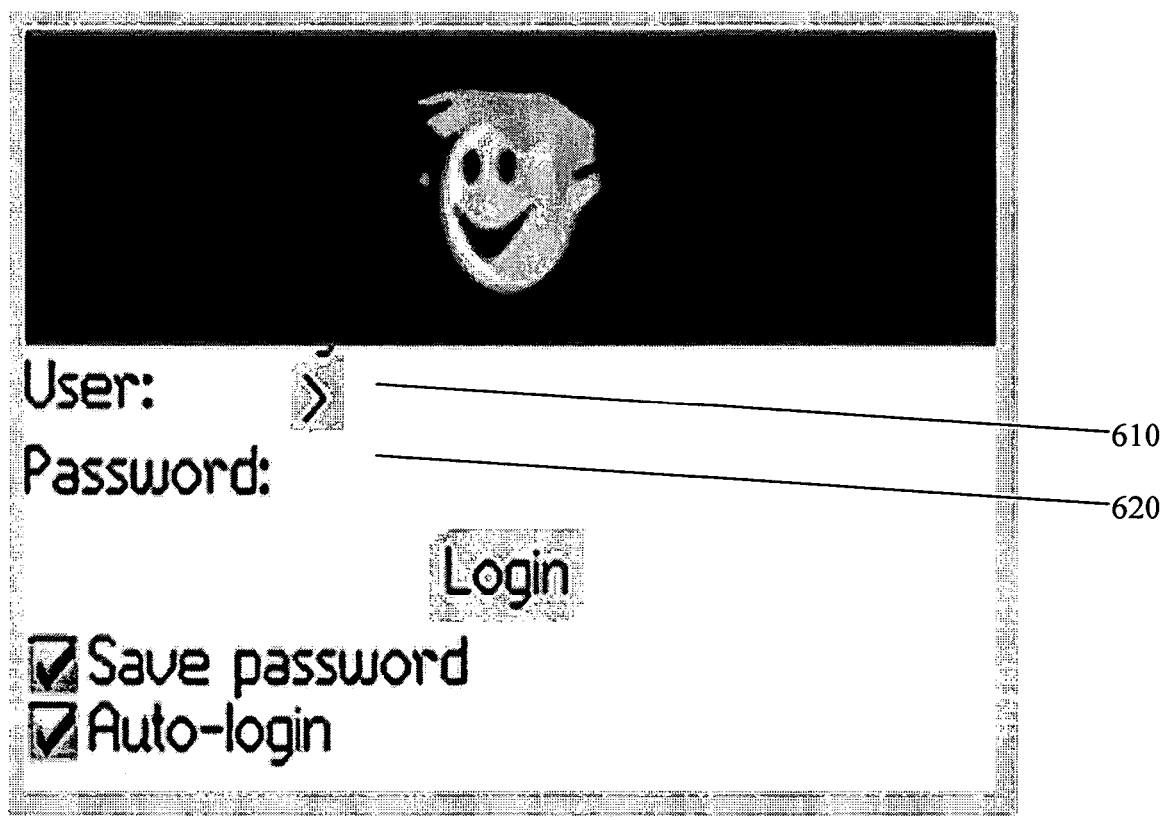
FIG. 6 is a screen capture illustrating an IM service log-on GUI for a wireless device or data processing system in accordance with an embodiment of the application.
Figure 7:
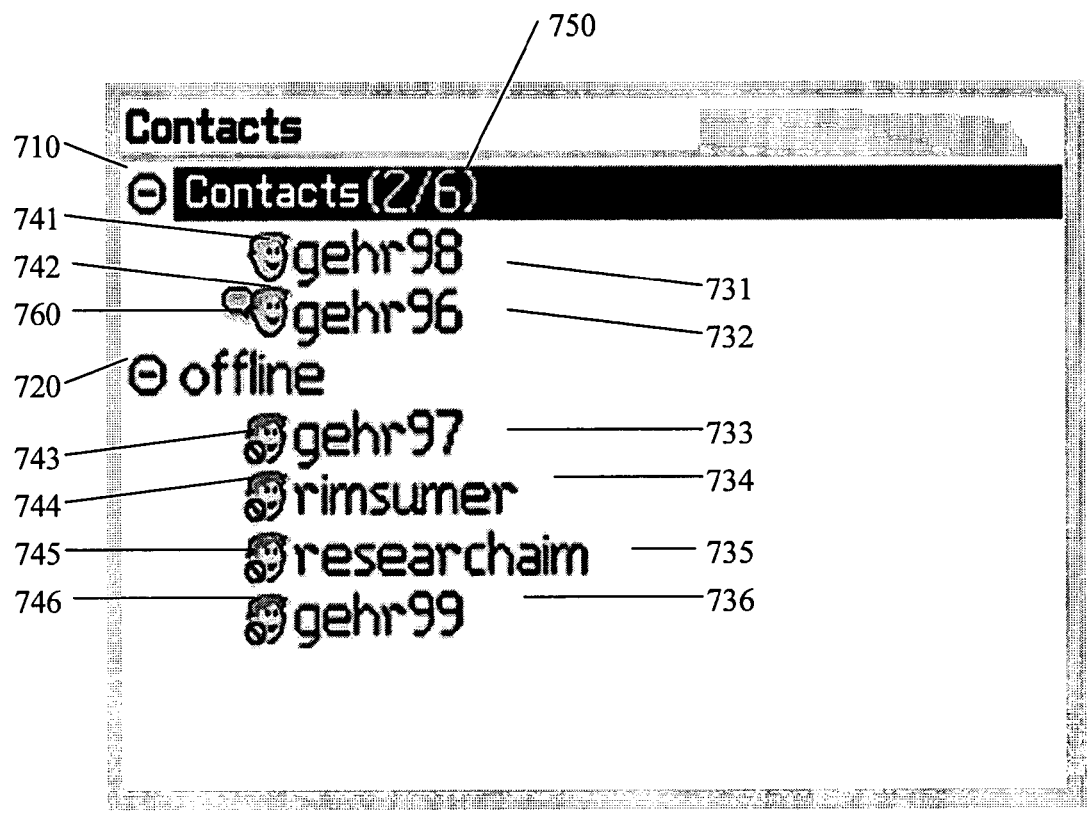
FIG. 7 is a screen capture illustrating a main IM service GUI for a wireless device or data processing system in accordance with an embodiment of the application.
Figure 8:
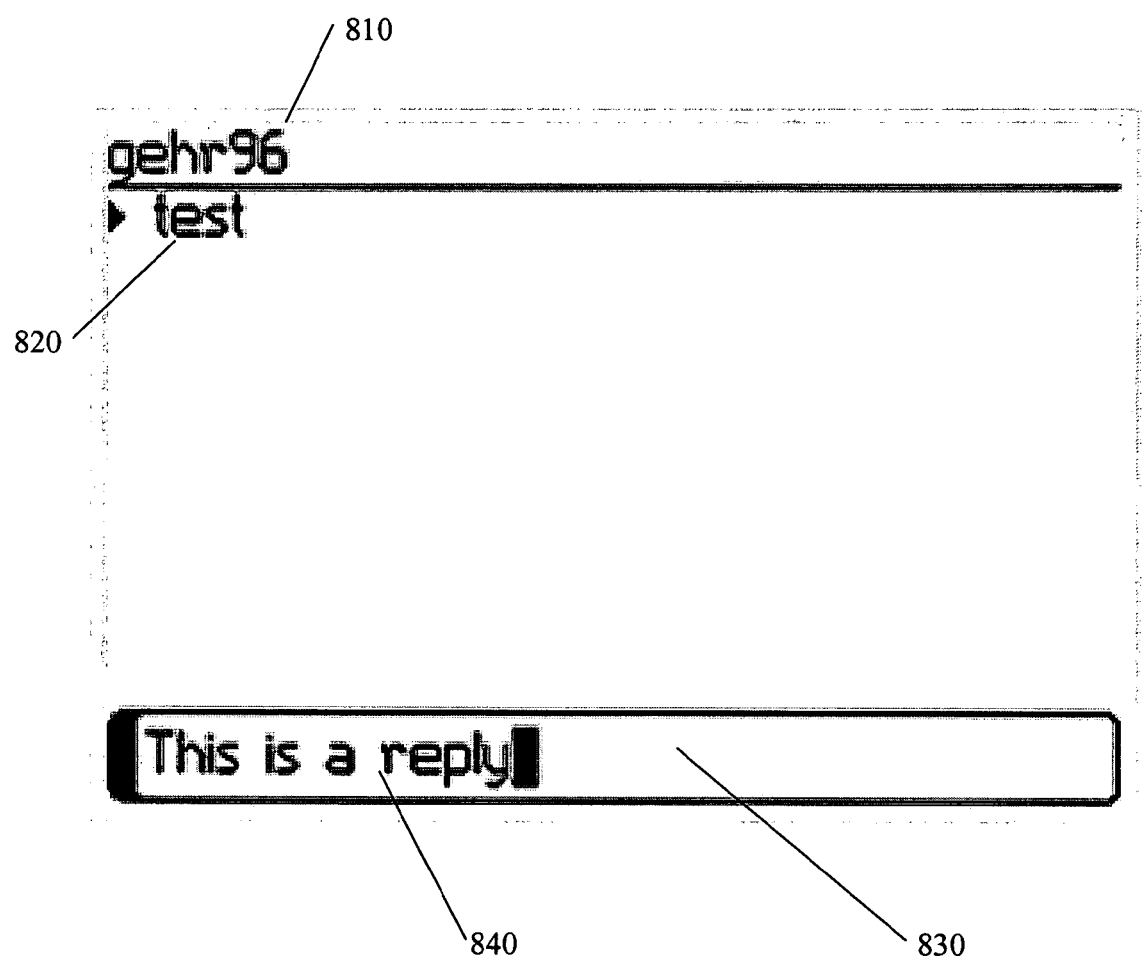
FIG. 8 is a screen capture illustrating an IM message GUI for a wireless device or data processing system in accordance with an embodiment of the application; and, FIG. 9 is a flow chart illustrating operations of modules for securing an instant messaging ("IM") conversation between at least a first and a second user, the first and second users having a first and a second client, respectively, in communication over a network, in accordance with an embodiment of the application.

FIGS. 5 through 8 are screen captures illustrating an exemplary IM service GUI 180, 185 for presentation on the display 122, 141 of a wireless device 102 or data processing system 101. In particular, FIG. 5 is a screen capture illustrating an application menu GUI 500 for a wireless device 102 or data processing system 101 in accordance with an embodiment of the application. A user initiates the IM service by clicking on an icon 510 representing the IM service in the GUI 500. FIG. 6 is a screen capture illustrating an IM service log-on GUI 600 for a wireless device 102 or data processing system 101 in accordance with an embodiment of the application. Upon initiating the IM service, and as described above, a user enters a username and password into respective fields 610, 620 in the GUI 600 to access the IM service. FIG. 7 is a screen capture illustrating a main IM service GUI 700 for a wireless device 102 or data processing system 101 in accordance with an embodiment of the application. Upon logging-on to the IM service, the main IM service GUI 700 is presented to the user. The main GUI 700 provides a listing 710 of the contacts, buddies, or users 731, 732 that are online and a listing 720 of the contacts, buddies, or users 733, 734, 735, 736 that are offline. The users are represented in the GUI 700 by a unique text string (e.g., a username) 731-736 and/or by a user icon 741-746. The GUI 700 provides an indication 750 of the number of users that are online with respect to the total number of users in the group of contacts (e.g., "2/6"). In addition, the GUI 700 provides an indication (e.g., a bubble icon) 760 that an online user (e.g., "gehr96" 732) has sent an IM message. By selecting the indication 760 or corresponding user text string 732 or user icon 742, a user may view the IM message and compose a response to it, if desired. FIG. 8 is a screen capture illustrating an IM message GUI 800 for a wireless device 102 or data processing system 101 in accordance with an embodiment of the application. The GUI 800 provides an identifier 810 of the sender of the IM message (e.g., "gehr96") and the content (e.g., text) 820 of the IM message (e.g., "test"). In addition, the GUI 800 provides a field 830 in which a user may compose a response (e.g., "This is a reply . . . " 840) to the IM message. The content 820, 840 of the IM message and response represents an IM conversation between the first and second 731, 732 users.

According to one embodiment, the IM conversation between the first and second users 731, 732 (or more users) can be secured by either of the users before the IM conversation begins, or at any time during the IM conversation, by selecting an option through their GUI 185, 180 that functions to inform the client 101, 102 of the other user that the IM conversation has been secured and that copying, cutting, and/or pasting of any or all of the IM conversation content is not to be allowed. This option may be selected through an object 196, 191 presented on each users' display screen 141, 122. For example, a padlock icon (not shown) may be displayed in a corner (e.g., the top left hand corner) of the main IM service GUI 700 to indicate activation of this option.

In particular, the first IM client 101 sends a message directly to the second IM client 102 to inform the second IM client 102 that the IM conversation has been secured and that copying, cutting, and/or pasting of any or all of the IM conversation content is not to be allowed. As described above, each of the first and second IM clients 101, 102 has at least one software module 206 stored within its memory 200 to implement the IM security related message. To facilitate security functions, each IM client 101, 102, may associate one or more flags or parameters with each IM message in an IM conversation, and/or with the entire IM conversation, and/or with each IM user or client. These flags or parameters may be embedded in a portion of the IM message or IM conversation itself and/or stored separately therefrom. If a third IM client joints the IM conversation, these flags or parameters are provided to the new IM client. According to an alternate embodiment, the first IM client 101 may send an IM security related message to the second IM client 102 through an IM server. In this alternate embodiment, the IM server may have at least one software module (e.g., 171) stored within its memory (e.g., 131) to implement the message.

According to another embodiment, the IM conversation between the first and second users 731, 732 (or more users) can be secured by either of the users before the IM conversation begins, or at any time during the IM conversation, by selecting an option through their GUI 185, 180 that functions to set an expiry period for the IM conversation so that the content of the IM conversation is automatically deleted, or "self-destructs", after the designated expiry period. This option may be selected through an object 196, 191 presented on each users' display screen 141, 122.

According to another embodiment, the IM conversation between the first and second users 731, 732 (or more users) can be secured by locking (i.e., preventing copying, cutting, and/or pasting) the content of the IM conversation. Locking in this embodiment is thus a default setting for the IM conversation. In order for a first user to copy, cut, and/or paste all or a portion of the content of the IM conversation, that user must receive explicit permission from the second user to unlock the IM conversation to allow for copying, cutting, and/or pasting. This permission may be requested by a user before the IM conversation begins, or at any time during the IM conversation, by selecting an option through their GUI 185, 180 that functions to send a request to the client 101, 102 of the other user for permission to unlock the IM conversation. This option may be selected through an object 196, 191 presented on the user's display screen 141, 122. Similarly, permission may be granted by a user upon receipt of the request to unlock the IM conversation by selecting an option through their GUI 185, 180 that functions to send a permission message to the client 101, 102 of the other user for granting permission to unlock the IM conversation. This option may be selected through an object 196, 191 presented on the user's display screen 141, 122.

According to another embodiment, the IM conversation between the first and second users 731, 732 (or more users) can be secured by locking (i.e., preventing copying, cutting, and/or pasting) the content of the IM conversation through a configurable parameter (e.g., an IT policy setting) that an IT manager can set for a user or group's IM client(s) 102, 101 whether they be mobile clients 102 or not 101. Locking in this embodiment is thus a IT policy setting for the IM conversation. In order for a first user to copy, cut, and/or paste all or a portion of the content of the IM conversation, that user must receive explicit permission from the IT manager to unlock the IM conversation to allow for copying, cutting, and/or pasting. This permission may be requested by a user before the IM conversation begins, or at any time during the IM conversation, by selecting an option through their GUI 185, 180 that functions to send a request to the client 101, 102 of the IT manager for permission to unlock the IM conversation. This option may be selected through an object 196, 191 presented on the user's display screen 141, 122. Similarly, permission may be granted by the IT manager upon receipt of the request to unlock the IM conversation by selecting an option through their GUI 185, 180 that functions to send a permission message to the client 101, 102 of the user for granting permission to unlock the IM conversation. This option may be selected through an object 196, 191 presented on the IT manager's display screen 141, 122.

According to another embodiment, a portion 820 of the IM conversation between the first and second users 731, 732 (or more users) that corresponds to one user, say the first user 732, can be secured by locking (i.e., preventing copying, cutting, and/or pasting) that portion 820 of the content of the IM conversation when the first user 732 is offline (i.e., not present). Locking in this embodiment is thus a default setting for the IM conversation. For example, if first user "gehr96" 732 is offline, then second user "gehr98" 731 cannot read gehr96's responses unless gehr96 is online (i.e., present) or unless gehr96 has given gehr98 permission to read gehr96's responses when gehr96 is offline. In order for a second user 731 to copy, cut, and/or paste a portion 820 of the content of the IM conversation attributable to a first user 732, the second 731 user must receive explicit permission from the first user 732 to unlock the first user's portion 820 of the IM conversation to allow for copying, cutting, and/or pasting of that portion 820 when the first user 732 is offline. This permission may be requested by a user before the IM conversation begins, or at any time during the IM conversation, by selecting an option through their GUI 185, 180 that functions to send a request to the client 101, 102 of the other user for permission to unlock the IM conversation. This option may be selected through an object 196, 191 presented on the user's display screen 141, 122. Similarly, permission may be granted by a user upon receipt of the request to unlock the IM conversation by selecting an option through their GUI 185, 180 that functions to send a permission message to the client 101, 102 of the other user for granting permission to unlock the IM conversation. This option may be selected through an object 196, 191 presented on the user's display screen 141, 122.

According to another embodiment, the IM conversation between the first and second users 731, 732 (or more users) can be secured through a combination of two or more of the above described embodiments.

Note that in addition to copying, cutting, and/or pasting, the above embodiments are also applicable to any user interface features that have the same or similar effects as copying, cutting, and/or pasting, such as, for example "one-click" forwarding of a conversation by email. Furthermore, the above embodiments are also applicable to any programmed features that have the same or similar effects as copying, cutting, and/or pasting, such as, for example, application program interface ("API") function calls or macro commands that can programmatically gain access to an IM conversation.

Advantageously, embodiments of the present application allow for the selective enabling and disabling of operations such as copying, cutting, and/or pasting by providing options that are configurable by IT departments or users themselves depending on the IM conversation.

Figure 9:
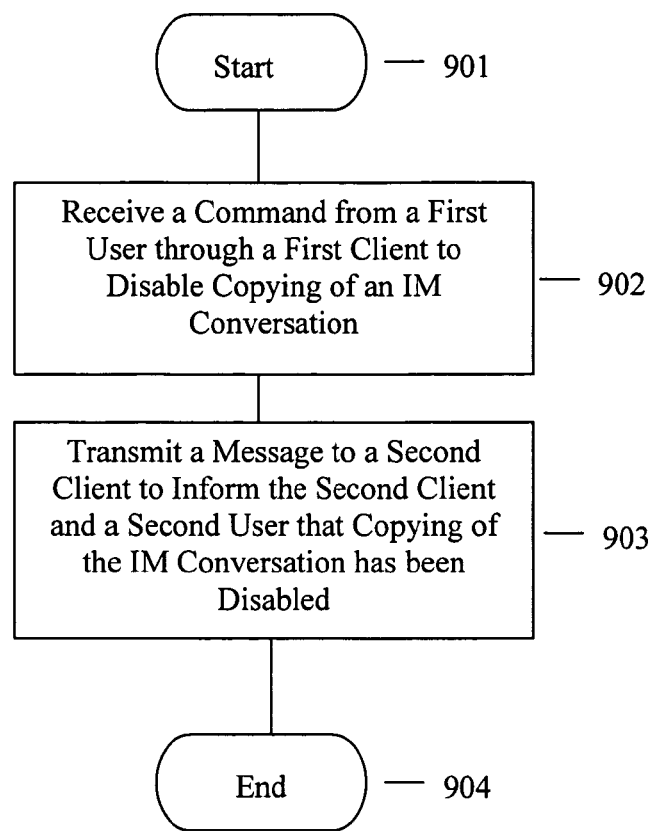

The above described method may be summarized with the aid of a flowchart. FIG. 9 is a flow chart illustrating operations 900 of modules 171, 206 for securing an instant messaging ("IM") conversation between at least a first and a second user, the first and second users having a first (e.g., 102) and a second client (e.g., 101), respectively, in communication over a network 100, in accordance with an embodiment of the application.

At step 901, the operations 900 start.

At step 902, a command is received from the first user through an input device (e.g., a clickable thumbwheel) 110 and a graphical user interface ("GUI") 180 presented on a display 122 of the first client 102 to disable copying of the IM conversation.

At step 903, a message is transmitted to the second client 101 to inform the second client 101 and the second user that copying of the IM conversation has been disabled.

At step 904, the operations 900 end.

Preferably, the copying includes at least one of cutting, pasting, editing, viewing, reading, forwarding, and programmatically accessing. Preferably, the method further includes receiving a command from the first user to delete at least a portion of the IM conversation after a period of time. Preferably, the method further includes: disabling copying of the IM conversation; receiving a command from the first user to transmit a message to the second client 101 to request the second user for permission to enable copying of the IM conversation; receiving a message at the first client 102 from the second client 101 granting permission to enable copying of the IM conversation; and, enabling copying of the IM conversation. Preferably, the second client 102 and the second user are an IM server (not shown) and an IM server user, respectively. Preferably, a first portion of the IM conversation is attributable to the first user and the method further includes receiving a command from the first user to disable copying of the first portion of the IM conversation while the first client 102 is off-line. Preferably, at least one of the first and second clients 101, 102 is a wireless device 102 having a keyboard 132 for selecting items in the GUI 180 to generate commands, wherein the keyboard 132 is one of a QWERTY keyboard, a modified QWERTY keyboard, a Dvorak keyboard, and an predictive text keyboard.

The above described method for IM conversation security is generally performed by the wireless device 102. However, according to an alternate embodiment, the method can be performed by the data processing system 101.

While embodiments of this application are primarily discussed as a method, a person of ordinary skill in the art will understand that the apparatus discussed above with reference to a wireless device 102 and a data processing system 101, may be programmed to enable the practice of the method of these embodiments. Moreover, an article of manufacture for use with a wireless device 102 or data processing system 101, such as a pre-recorded storage device or other similar computer readable medium including program instructions recorded thereon, may direct the wireless device 102 or data processing system 101 to facilitate the practice of the method of these embodiments. It is understood that such apparatus and articles of manufacture also come within the scope of the application.

The embodiments of the application described above are intended to be exemplary only. The scope of the application is therefore intended to be limited solely by the scope of the appended claims.

What is claimed is:

1. A method for securing an instant messaging ("IM") conversation between at least a first and a second user, the first user and second user having a first communication device and a second communication device, respectively, configured for communicating over a network, the method comprising:
receiving, at the second communication device, an indication that the first communication device is online;
enabling, at the second communication device, copying, cutting and pasting of data from the IM conversation associated with the first user in response to receiving the indication that the first communication device is online;
receiving, at the second communication device, data from the IM conversation associated with the first user;
receiving, at the second communication device an indication that the first communication device is offline; and
disabling, at the second communication device, copying, cutting and pasting of the data from the IM conversation associated with the first user in response to receiving the indication that the first communication device is offline.

2. The method of claim 1, wherein the disabling further includes disabling editing, viewing, reading, forwarding, and programmatically accessing.

3. The method of claim 1, further comprising:
receiving a command from the first communication device causing at least a portion of the IM conversation to be deleted after a period of time.

4. The method of claim 1, further comprising:
subsequent to disabling, at the second communication device, copying, cutting and pasting of the data from the IM conversation associated with the first user, sending a request from the second communication device to the first communication device to enable copying, cutting and pasting of data from the IM conversation associated with the first user;
receiving, at the second communication device, a message to cause enabling of copying of the data from the IM conversation associated with the first user; and
enabling, at the second communication device, copying, cutting and pasting of data from the IM conversation associated with the first user in response to receiving the message.

5. The method of claim 1 further comprising:
in response to determining that a third user associated with a third communication device has joined the IM conversation, sending, to the third communication device, a message to cause disabling of copying, cutting and pasting of the data from the IM conversation associated with the first user at the third communication device.

6. A communication device for securing an instant messaging ("IM") conversation between at least a first and a second user, comprising:
a processor coupled to memory and to an interface to a network and adapted for:
receiving an indication that a second communication device associated with the second user is online;
enabling copying, cutting and pasting of data from the IM conversation associated with the second user in response to receiving the indication that the second communication device is online;
receiving data from the IM conversation associated with the second user;
receiving an indication that the second communication device is offline; and
disabling of copying, cutting and pasting of data from the IM conversation associated with the second user in response to receiving the indication that the second communication device is offline.

7. A method for securing an instant messaging ("IM") conversation between at least a first and a second user, the first user and second user having a first communication device and a second communication device, respectively, configured for communicating over a network, the method comprising:
receiving, at the second communication device, an indication that the first communication device is online;
enabling, at the second communication device, copying, cutting and pasting of data from the IM conversation associated with the first user in response to receiving the indication that the first communication device is online;
receiving, at the second communication device, data from the IM conversation associated with the first user;
receiving, at the second communication device, an indication that the first communication device is offline;
determining whether the second user has permission for copying, cutting and pasting of the data from the IM conversation associated with the first user when the first communication device is offline; and
disabling, at the second communication device, copying, cutting and pasting of data from the IM conversation associated with the first user in response to a determination that the second user does not have permission for copying, cutting and pasting of the data from the IM conversation associated with the first user when the first communication device is offline.

8. The method of claim 7, further comprising:
enabling, at the second communication device, copying, cutting and pasting of data from the IM conversation associated with the first user in response to a determination that the second user has permission for copying, cutting and pasting of the data from the IM conversation associated with the first user when the first communication device is offline.

9. The method of claim 7, wherein the disabling further includes disabling editing, viewing, reading, forwarding, and programmatically accessing.

10. A method for securing an instant messaging ("IM") conversation between at least a first and a second user, the first user and second user having a first communication device and a second communication device, respectively, configured for communicating over a network, the method comprising:
receiving, at the second communication device, an indication that the first communication device is online;
enabling, at the second communication device, copying, cutting and pasting of data from the IM conversation associated with the first user in response to receiving the indication that the first communication device is online;
receiving, at the second communication device, data from the IM conversation associated with the first user;
receiving, at the second communication device, an indication that the first communication device is offline;
determining whether an IT policy setting permits copying, cutting and pasting of the data from the IM conversation associated with the first user when the first communication device is offline; and
disabling, at the second communication device, copying, cutting and pasting data from the IM conversation associated with the first user in response to a determination that the IT policy setting does not permit copying, cutting and pasting of the data from the IM conversation associated with the first user when the first communication device is offline.

11. The method of claim 10, further comprising:
enabling, at the second communication device, copying, cutting and pasting data from the IM conversation associated with the first user in response to a determination that the IT policy setting permits copying, cutting and pasting of the data from the IM conversation associated with the first user when the first communication device is offline.

12. The method of claim 10, wherein the disabling further includes disabling editing, viewing, reading, forwarding, and programmatically accessing.

13. The communication device of claim 6, wherein the disabling further includes disabling editing, viewing, reading, forwarding, and programmatically accessing.

14. A communication device for securing an instant messaging ("IM") conversation between at least a first and a second user, comprising:
a processor coupled to memory and to an interface to a network and adapted for:
receiving an indication that a second communication device associated with the second user is online;
enabling copying, cutting and pasting of data from the IM conversation associated with the second user in response to receiving the indication that the second communication device is online;
receiving data from the IM conversation associated with the second user;
receiving an indication that the second communication device is offline;
determining whether the first user associated with the communication device has permission for copying, cutting and pasting of the data from the IM conversation associated with the second user when the second communication device is offline; and
disabling copying, cutting and pasting of data from the IM conversation associated with the second user in response to a determination that the first user does not have permission for copying, cutting and pasting of the data from the IM conversation associated with the second user when the second communication device is offline.

15. A communication device for securing an instant messaging ("IM") conversation between at least a first and a second user, comprising:
a processor coupled to memory and to an interface to a network and adapted for:
receiving an indication that a second communication device associated with the second user is online;
enabling copying, cutting and pasting of data from the IM conversation associated with the second user in response to receiving the indication that second communication device is online;
receiving data from the IM conversation associated with the second user;
receiving an indication that the second communication device is offline;
determining whether an IT policy setting permits copying, cutting and pasting of the data from the IM conversation associated with the second user when the second communication device is offline; and
disabling of copying, cutting and pasting data from the IM conversation associated with the first user in response to a determination that the IT policy setting does not permit copying, cutting and pasting of the data from the IM conversation associated with the first user when the first communication device is offline.

* * * * *